United States Patent
Yoon et al.

(10) Patent No.: US 9,199,483 B2
(45) Date of Patent: Dec. 1, 2015

(54) KEYBOARD MANUFACTURING APPARATUS AND METHOD

(71) Applicant: SAMSUNG ELECTRONICS CO., LTD., Suwon-si (KR)

(72) Inventors: Hye Ran Yoon, Seoul (KR); Ah Hyun Bae, Hwanseong (KR); Kyo Ree Lee, Seoul (KR); Geun Ho Lee, Yongin (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 13/712,241

(22) Filed: Dec. 12, 2012

(65) Prior Publication Data

US 2013/0155161 A1    Jun. 20, 2013

(30) Foreign Application Priority Data

Dec. 15, 2011   (KR) ................. 10-2011-0135067

(51) Int. Cl.
*B41J 3/407* (2006.01)
*B41J 11/00* (2006.01)
*G06F 3/02* (2006.01)
*H01H 13/88* (2006.01)

(52) U.S. Cl.
CPC ............... *B41J 3/4073* (2013.01); *B41J 3/407* (2013.01); *B41J 11/002* (2013.01); *B41J 11/0015* (2013.01); *G06F 3/02* (2013.01); *H01H 13/88* (2013.01); *H01H 2219/028* (2013.01); *H01H 2229/00* (2013.01)

(58) Field of Classification Search
CPC ..................... B41J 11/0015; B41J 11/002
See application file for complete search history.

(56) References Cited

U.S. PATENT DOCUMENTS

| | | | |
|---|---|---|---|
| 2005/0042013 A1 | 2/2005 | Lee | |
| 2009/0207224 A1* | 8/2009 | Cofler | 347/102 |
| 2010/0253757 A1 | 10/2010 | Tseng et al. | |
| 2010/0309274 A1 | 12/2010 | Huang | |

FOREIGN PATENT DOCUMENTS

JP    11-227257    8/1999

* cited by examiner

*Primary Examiner* — Justin Seo
(74) *Attorney, Agent, or Firm* — Staas & Halsey LLP (57) ABSTRACT

Disclosed herein are a keyboard manufacturing apparatus and method that provide improved printing of at least one of a letter, a symbol, a number, and a pattern onto a keycap of a keyboard. The keyboard manufacturing apparatus includes a loader to load a keyboard, an unloader to unload the keyboard, a printing device provided between the loader and the unloader to print at least one of the letter, symbol, number and pattern onto the keyboard, wherein the printing device includes a support on which the keyboard is positioned, and an inkjet unit to print the at least one of the letter, symbol, number and pattern onto the keyboard, wherein the inkjet unit includes an inkjet head containing ink with a color identical to a specific color to be printed onto the keyboard, and a hardeners positioned on one side of the inkjet head to dry the ink.

15 Claims, 6 Drawing Sheets

FIG. 6

KEYBOARD MANUFACTURING APPARATUS AND METHOD

CROSS-REFERENCE TO RELATED APPLICATIONS

This application claims the benefit of Korean Patent Application No. 10-2011-135067, filed on Dec. 15, 2011 in the Korean Intellectual Property Office, the disclosure of which is incorporated herein by reference.

BACKGROUND

1. Field

Embodiments of the present disclosure relate to a keyboard manufacturing apparatus and method that provide improved printing of at least one of letters, symbols, numbers, and patterns onto a keycap of a keyboard.

2. Description of the Related Art

A keyboard is a computer input device configured with a housing and keycaps. The keyboard is configured with, for example, keycaps for Hangul, English letters, numbers and special characters and 12 functions. A letter, symbol, number or pattern is printed onto each keycap so that a user can recognize the keycap.

The types of printing onto a keycap include double shot injection molding, dye sublimation, screen printing, laser engraving and inkjet printing.

In double shot injection molding, a character is not printed but is molded using two different kinds of plastics. This technique may produce a clear character on the keycap, but it may increase manufacturing costs. It may also be difficult to express a complicated character, in particular, delicate portions thereof.

In dye sublimation, ink is allowed to permeate into a plastic resin at high temperature and high pressure. The character printed in this way is highly durable and may not provide tactile sensation thereof to the user when the keycap thereof is pressed, but this printing may produce blurred character edges.

In screen printing, a character is printed as ink is forced though the hollow parts in a stencil onto which the character is to be printed. Screen printing is easy and inexpensive, but it requires preparation of separate stencils for different products model and colors. Accordingly, many different stencils need to be produced and managed, resulting in low production efficiency with respect to time and costs.

In laser engraving, which is widely used today, the surface of the keycap is burned to engrave a required character. This technique may require low cost and provide digital engraving, but it may leave dot-like traces since it burns the surface of the keycap during the process of engraving. Further, the colors for the characters are limited since the characters are produced by laser burning.

In inkjet printing, fine dots sprayed through a nozzle create an image. Inkjet printing may produce the image in various colors and may be digitally carried out, but printing is performed at lower speed than in other techniques and adhesion between the ink and the keycap is weaker than in other techniques.

SUMMARY

Therefore, it is an aspect of the present disclosure to provide a keyboard manufacturing apparatus and method capable of achieving improved printing of at least one of a letter, a number, a symbol, and a pattern onto a keycap of a keyboard.

Additional aspects will be set forth in part in the description which follows and, in part, will be obvious from the description, or may be learned by practice of the invention.

In accordance with one aspect, a keyboard manufacturing apparatus includes a loader to load a keyboard, an unloader to unload the keyboard, a printing device provided between the loader and the unloader to print at least one of a letter, a symbol, a number and a pattern onto the keyboard, wherein the printing device includes a support on which the keyboard is positioned, and an inkjet unit to print the at least one of the letter, symbol, number and pattern onto the keyboard, wherein the inkjet unit includes an inkjet head containing ink having a color identical to a specific color to be printed onto the keyboard, and a hardener positioned on one side of the inkjet head to dry the ink.

The hardener may be an ultraviolet light source.

The inkjet head and the hardeners may be arranged in a row.

The inkjet head and the hardeners may be provided to be horizontally movable.

The inkjet head may include at least one head portion.

The printing device may further include a protective layer spray unit to spray a protective layer onto the keyboard.

The support may include a conveyor which moves the keyboard according to keyboard manufacturing processes.

The inkjet unit and the protective layer spray unit may be arranged on an upper side of the conveyor to face each other.

At least one of the loader and the unloader may be vertically movable to transport the keyboard.

In accordance with one aspect, a keyboard manufacturing method includes loading a keyboard to a keyboard manufacturing apparatus, spraying on the keyboard ink having a color identical to a specific color representing at least one of a letter, a symbol, a number and a pattern to be printed onto the keyboard, drying the ink sprayed on the keyboard through a hardener, and unloading the keyboard from the keyboard manufacturing apparatus.

For a plurality of keycaps forming the keyboard, drying a region of the keycaps through the hardeners may be performed concurrently with spraying the ink on another region of the keycaps.

After drying of the ink sprayed on the keyboard, a protective layer may be sprayed on the keyboard.

The protective layer may be sprayed on a wider area than an area of the at least one of the letter, symbol, number and pattern printed on the keyboard.

After the spraying and drying of the at least one of the letter, symbol, number and pattern, the keyboard may be transported through a conveyor so as to have the protective layer sprayed thereon.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings. The spirit of the present disclosure is applicable to various kinds of keyboards, and the keyboard described hereafter is only illustrative.

Figure 1:
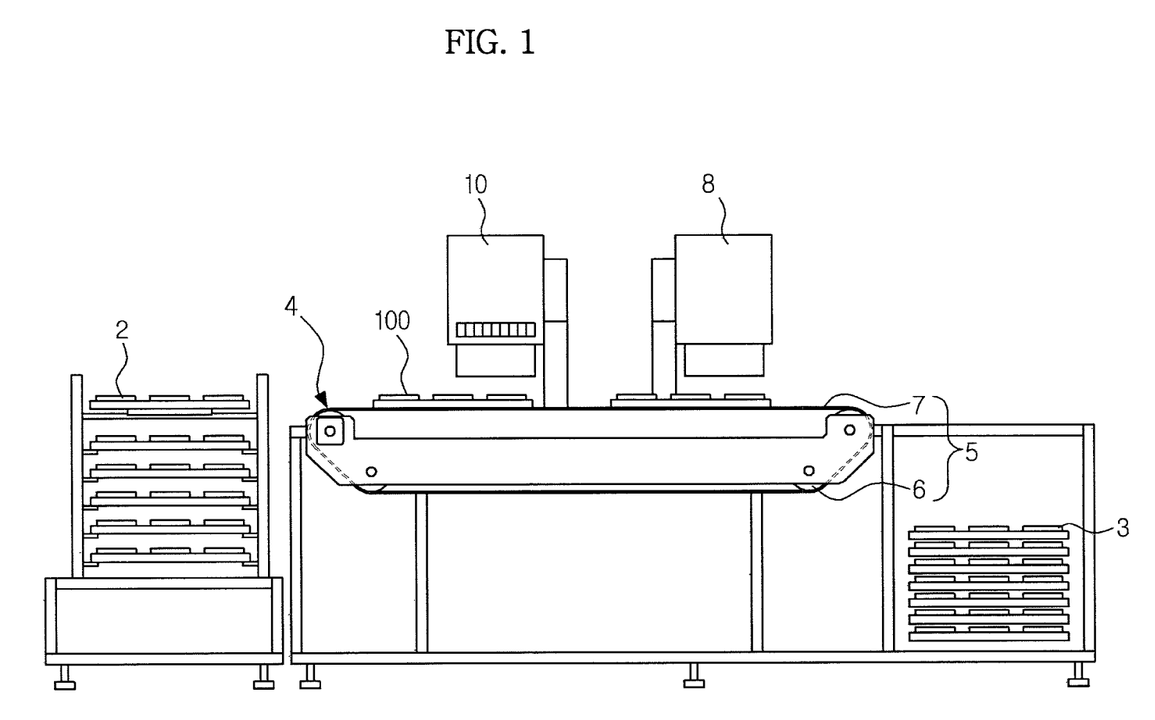
FIG. 1 is a view illustrating a keyboard manufacturing apparatus according to one embodiment.
Figure 2:
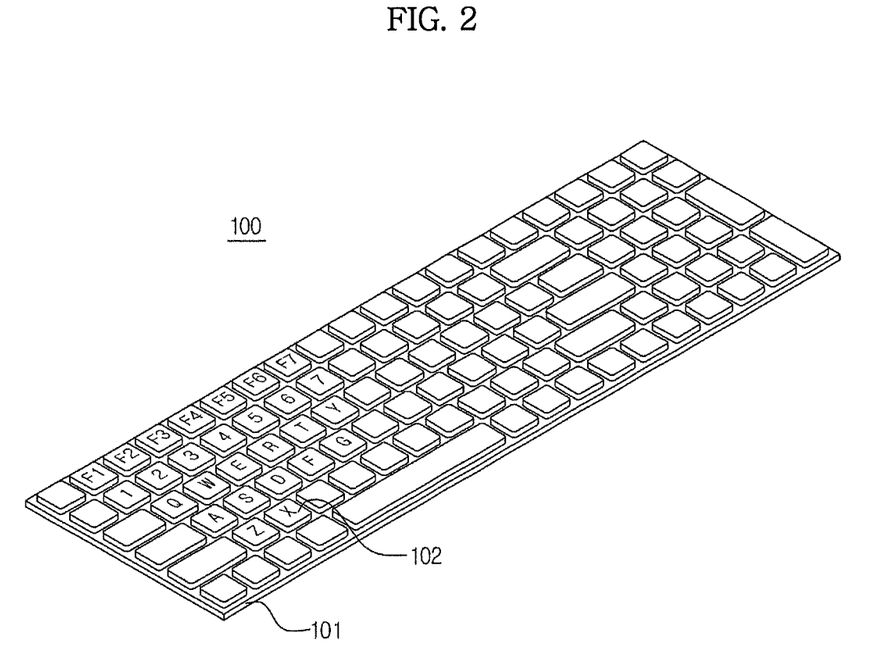
FIG. 2 is a view illustrating a keyboard manufactured according to one embodiment.

FIG. 1 illustrates a keyboard manufacturing apparatus according to one embodiment, and FIG. 2 is a view illustrating a keyboard manufactured according to the illustrated embodiment of the present invention.

Through the keyboard manufacturing apparatus 1 shown in FIG. 1, a keyboard 100 shown in FIG. 2 may be manufactured. The keyboard 100 is illustrated as a device to input information to a computer or a typewriter but is not intended to limit the scope of the present disclosure.

The keyboard 100 includes a housing 101 forming the outer appearance of the keyboard 100 and keycaps 102 arranged in the housing. The keyboard 100 is electronically or mechanically operated by pressing one or more keycap 102. For the electronically-operated keyboard, a circuit to which a lower side of each keycap 102 is connected measures the amount of charge generated when one keycap 102 is pressed and detects the pressing of the keycap 102. For the mechanically-operated keyboard, the pressing of each keycap 102 is determined by current generated by connection and disconnection of two metallic pieces on the lower side of the keycap 102 when the keycap 102 is pressed. Embodiments of the present invention are applicable to both the electronically-operated keyboard and the mechanically-operated keyboard. At least one of a letter, a symbol, a number and a pattern is printed onto each keycap 102 so that a user can recognize the keycap 102.

The keyboard manufacturing apparatus 1 includes a loader 2 to load the keyboard 100 and an unloader 3 to unload the keyboard 100. Also, the keyboard manufacturing apparatus 1 includes a printing device 4 to print at least one of a letter, a symbol, a number and a pattern onto the keyboard 100. In the illustrated case, a process of printing onto the keycaps 102 thereof is performed with a plurality of keyboards 100 loaded, but embodiments of the present invention are not limited thereto. It may be possible to perform the printing under the condition that one keyboard 100 is loaded.

The printing device 4 may include a support 5 on which the keyboard 100 is positioned, and an inkjet unit 10 to print at least one of the letter, symbol, number and pattern onto the keyboard 100. The support 5 may be connected with the loader 2 and the unloader 3.

The printing device 4 is positioned between the loader 2 and the unloader 3. Thus, the keyboard 100 is moved from the loader 2 to the printing device 4 and from the printing device 4 to the unloader 3. To move the keyboard 100, the support 5 may be provided with a conveyor. Provided on both sides of the conveyor are driving pulleys 6, which drive a wide endless belt 7 in a ring shape installed around the driving pulleys 6 such that the keyboard 100 positioned on the upper side of the belt 7 may be moved.

The loader 2 and the unloader 3 may have a vertically movable device to ensure smooth loading and unloading.

The inkjet unit 10 includes an inkjet head 20 to contain ink and hardeners 12 and 13 to dry the ink printed onto the keycaps 102. Printing and drying processes are carried out for the keycaps 102 in the same manner and, as such, the following description will be given only in conjunction with one keycap, for convenience of description. Contained in the inkjet head 20 is ink having a color identical to a specific color to be printed onto the keyboard 102. According to the present invention, the color of the ink contained in the inkjet head 20 is printed onto the keycap 102. This will be described below.

The printing device 4 may further include a protective layer spray unit 8 to spray a protective layer onto the keyboard 100. The protective layer spray unit 8 is positioned behind the inkjet unit 10. A protective layer 104 is sprayed after at least one of the letter, number, symbol and pattern is printed and the ink is dried by the hardeners 12 and 13.

The inkjet unit 10 and the protective layer spray unit 8 may be positioned on the upper side of the support 5 and may be arranged to face each other. Thereby, after the ink is sprayed from the inkjet unit 10 and printed onto the keycap 102, the keyboard 100 may be moved to the protective layer spray unit 8 along the support 5 so that the protective layer 104 can be sprayed on the keycap 102 by the protective layer spray unit 8.

Figure 3:
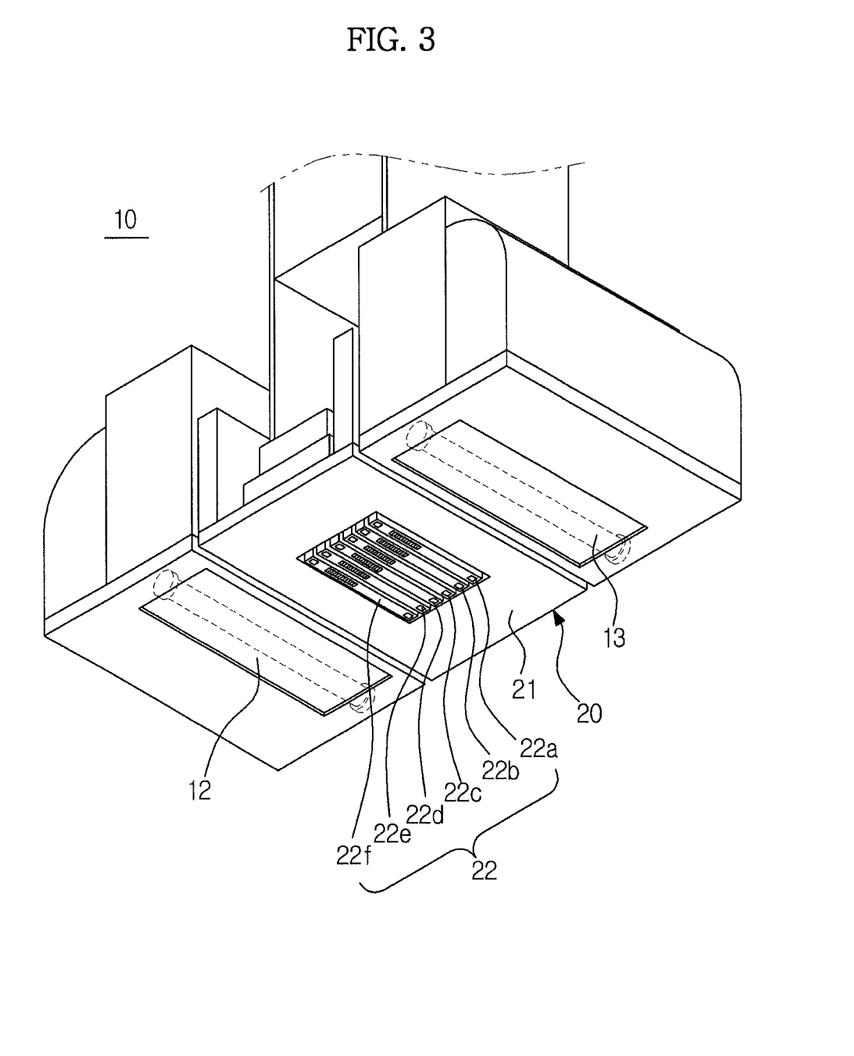
FIG. 3 is an enlarged view showing main parts of the keyboard manufacturing apparatus according to one embodiment.

FIG. 3 is an enlarged view of main parts of the keyboard manufacturing apparatus according to one embodiment.

As shown in FIG. 3, the inkjet unit 10 includes the inkjet head 20 to spray ink and hardeners 12 and 13 to dry the printed ink. A plurality of inkjet units 10 may be provided.

The inkjet head 20 may include at least one head portion 22. The at least one head portion 22 may be inserted into a case 21 forming the outer appearance of the inkjet head 20. Inserted in the case 21 are a first head portion 22a, a second head portion 22b, a third head portion 22c, a fourth head portion 22d, a fifth head portion 22e and a sixth head portion 22f. In the illustrated case, the at least one head portion 22 includes six head portions inserted in the inkjet head 20, but embodiments are not limited thereto. The head portions 22 may contain ink having the same color or contain ink of different colors, respectively.

The hardeners 12 and 13 are provided to harden the printed ink. The first hardener 12 and the second hardener 13 are positioned on both sides of the inkjet head 20, respectively. The hardeners 12 and 13 may include an ultraviolet (UV) light source. The UV light source rapidly hardens the ink on the keycap 102. The UV light irradiated from the hardeners 12 and 13, which are high intensity UV lights, cause photopolymerization of the ink printed onto the keycap 102, thereby accelerating the bonding of molecules to instantly dry the ink.

The inkjet head 20 and the hardeners 12 and 13 are aligned. Also, the inkjet unit 10 including the inkjet head 20 and the hardeners 12 and 13 may be arranged to be horizontally movable. Accordingly, the ink may be sprayed by the inkjet head 20 onto the keycaps 102 in a specified region of the keyboard 100 at the same time as the ink sprayed on the keycaps 102 in another specified region of the keyboard 100 is dried by the hardener 12 or 13. The printing and hardening have been separately performed in conventional cases, whereas the embodiments of the present invention allow them to be performed simultaneously, resulting in possible reduction of lead time.

Figure 4:
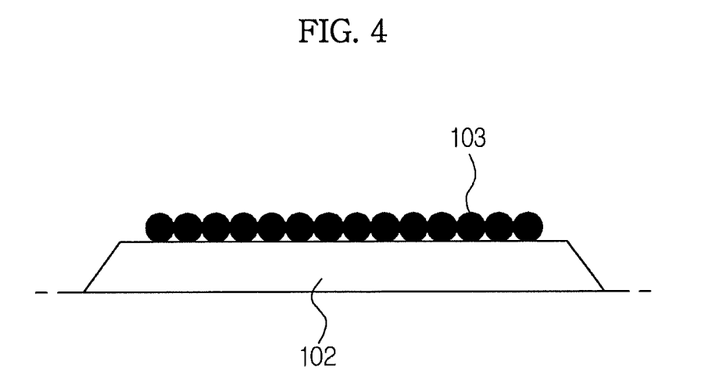
FIG. 4 is a schematic view illustrating ink printed onto a keycap according to one embodiment.

FIG. 4 schematically illustrates the ink printed onto the keycap according one embodiment.

As shown in FIG. 4, according to one embodiment o, the ink is uniformly sprayed on the keycap 102 to form a letter, a number, a symbol or a pattern. Conventionally, cyan, magenta, yellow and black inks have been mixed to produce a required color. For white color, rather than using white ink, the color has been rendered by leaving a desired portion of the keycap 102 unsprayed, exposing the original color of the keycap 102, and because of the failure to completely cover the keycap 102 with a print layer 103, there has been a possibility of degradation of wear resistance of the entire printed character. In the embodiment, inks of different colors are contained in respective head portions 22 so that ink of a specified color is printed onto the keycap 102 to produce the same color as the specified color of the ink on the keycap 102. Therefore, there is no possibility of exposing the original color of the keycap 102 on the portions of the keycap 102 where the letters, numbers, symbols or patterns are formed, differently from conventional cases, and thus the wear resistance of the characters is improved.

Figure 5:
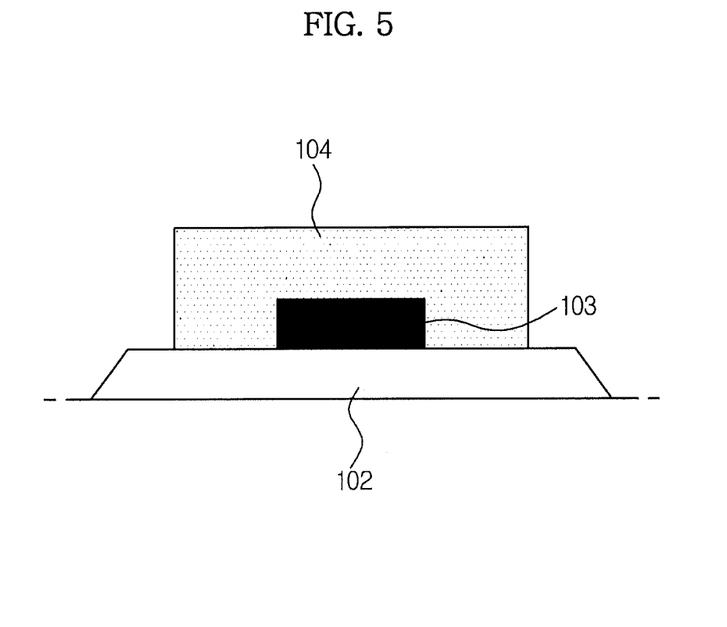
FIG. 5 is a schematic view illustrating the protective layer sprayed on a keycap according to one embodiment.

FIG. 5 schematically illustrates the protective layer sprayed on the keycap according to one embodiment.

As shown in FIG. 5, the protective layer 104 is sprayed over the print layer 103 printed onto the keycap 102. The protective layer 104 is sprayed over a wider area than the area of the print layer 103. In this case, the protective layer 104 encloses the print layer 103 completely, and thus the possibility of the print layer 103 wearing off is reduced, and wear resistance is improved.

Figure 6:
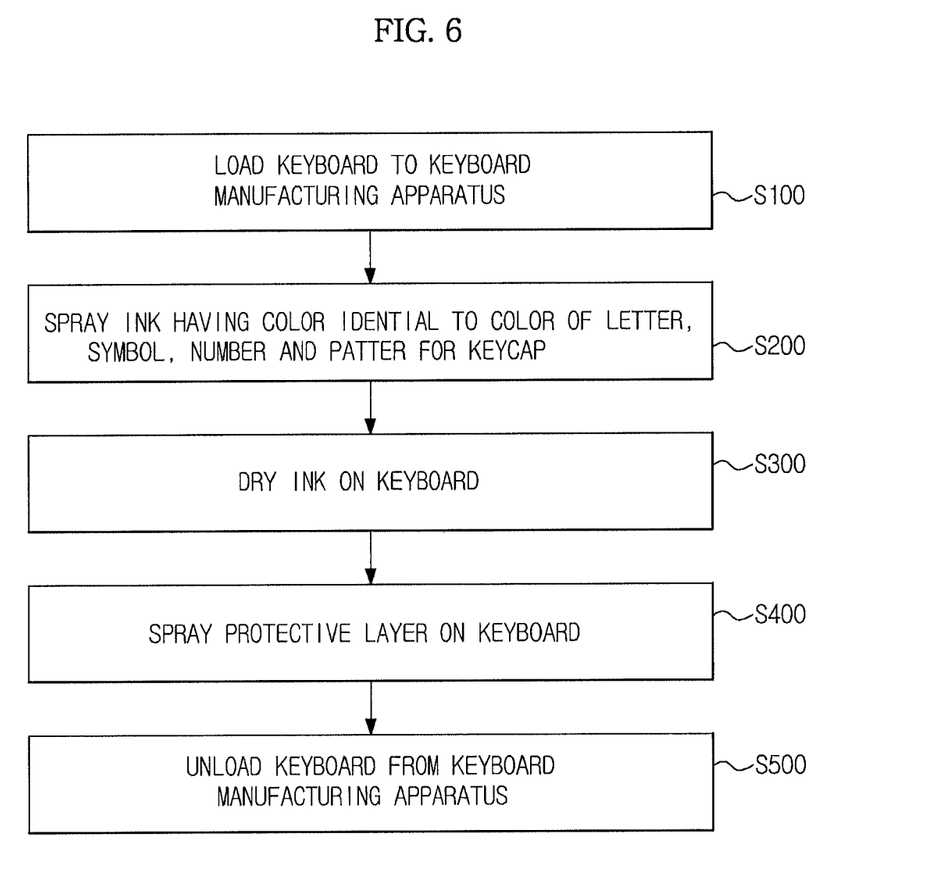
FIG. 6 is a flowchart illustrating the processes of manufacturing a keyboard using the keyboard manufacturing apparatus according to one embodiment.

FIG. 6 is a flowchart illustrating the processes of manufacturing a keyboard using the keyboard manufacturing apparatus according to one embodiment.

The keyboard 100 is loaded to the keyboard manufacturing apparatus 1 (S100) and then moved to the printing device 4. Through the inkjet unit 10 of the printing device 4, the ink having a color identical to the color of the letters, symbols, numbers or patterns is sprayed on the keycap 102 of the keyboard 100 (S200).

The ink sprayed on the keycap 102 is dried through the hardeners 12 and 13 (S300). The hardeners 12 and 13 may be provided with a UV light source irradiating UV light. The drying of the ink on the keycap 102 is accelerated by the hardeners 12 and 13. While the ink on the keycap 102 in a specific region of the keyboard 100 is dried through the hardener 12 or 13, the ink is sprayed on the keycap 102 in another specific region of the keyboard 100. That is, the spraying and the hardening are performed at the same time, and therefore process lead time may be reduced.

After drying, the protective layer 104 is sprayed on the keyboard 100 (S400). The protective layer 104 is sprayed over a wider area than the area of the print layer 103, and thus wear resistance may be improved. After drying by the hardeners 12 and 13, the keyboard 100 is transported along the conveyor 5 and spraying of the protective layer 104 is performed. Thus, while the spraying of the protective layer 104 is performed on one keyboard 100, the hardening of at least one of the letter, number, symbol and pattern may be performed on another keyboard 100. Accordingly, it may be possible to shorten the printing process time on the keycap 102.

Thereafter, the keyboard 100 is unloaded from the keyboard manufacturing apparatus 1 (S500).

As is apparent from the above description, it may be possible, with the keyboard manufacturing apparatus and method according to the embodiments, to reduce production time and improve wear resistance of the letters, numbers, symbols and patterns printed onto the keycaps.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A keyboard manufacturing apparatus comprising:
a loader to load a keyboard;
an unloader to unload the keyboard; and
a printing device provided between the loader and the unloader to print at least one of a letter, a symbol, a number and a pattern onto the keyboard,
wherein the printing device comprises:
a support on which the keyboard is positioned;
an inkjet unit to print the at least one of the letter, symbol, number and pattern onto the keyboard; and
a protective layer spray unit to spray a protective layer onto the keyboard, such that the protective layer spraying unit is positioned behind the inkjet unit,
wherein the inkjet unit comprises:
at least one inkjet head to contain ink having a color identical to a specific color to be printed onto the keyboard; and
a hardener positioned on one side of the inkjet head to dry the ink,
wherein the inkjet head comprises a plurality of inkjet head portions, wherein each of the head portion discharges a different color of ink,
wherein the keyboard manufacturing apparatus is configured such that the protective layer spray unit sprays the protective layer onto the keyboard simultaneously as the hardener dries ink printed onto another keyboard.

2. The keyboard manufacturing apparatus according to claim 1, wherein the hardener is an ultraviolet light source.

3. The keyboard manufacturing apparatus according to claim 1, wherein the inkjet head and the hardener are aligned.

4. The keyboard manufacturing apparatus according to claim 3, wherein the inkjet head and the hardener are arranged to be horizontally movable.

5. The keyboard manufacturing apparatus according to claim 1, wherein the support comprises a conveyor which moves the keyboard according to keyboard manufacturing processes.

6. The keyboard manufacturing apparatus according to claim 5, wherein the inkjet unit and the protective layer spray unit are arranged on an upper side of the conveyor adjacent to each other.

7. The keyboard manufacturing apparatus according to claim 1, wherein at least one of the loader and the unloader is vertically movable to transport the keyboard.

8. A keyboard manufacturing method comprising:
loading a keyboard to a keyboard manufacturing apparatus;
spraying on the keyboard ink having a color identical to a specific color representing at least one of a letter, a symbol, a number and a pattern to be printed onto the keyboard;
drying the ink sprayed on the keyboard using a hardener; and
spraying on the keyboard a protective layer using a protective layer spray unit,
unloading the keyboard from the keyboard manufacturing apparatus,
wherein the spraying of the ink and the drying of the ink are carried out for a plurality of keycaps forming the keyboard, in such a manner that drying the keycaps in a specified region of the keyboard through the hardener is performed concurrently with spraying the ink on the keycaps in another specified region of the keyboard, and
wherein the protective layer spray unit sprays the protective layer onto the keyboard simultaneously as the hardener dries ink printed onto another keyboard.

9. The keyboard manufacturing method according to claim 8, further comprising, after the drying of the ink sprayed on the keyboard, spraying the protective layer onto the keyboard.

10. The keyboard manufacturing method according to claim 9, wherein the protective layer is sprayed on a wider area than an area of the at least one of the letter, symbol, number and pattern printed onto the keyboard.

11. The keyboard manufacturing method according to claim 9, wherein after the spraying and the drying of the at least one of the letter, symbol, number and pattern, the keyboard is transported through a conveyor and the protective layer is sprayed onto the keyboard.

12. A keyboard manufacturing apparatus comprising:
a loader to load a keyboard;
an unloader to unload the keyboard;
a conveying unit to move the keyboard from the loader to the unloader;
a printing unit located above the conveying unit to print an image on the individual keys of the keyboard;
wherein the printing unit comprises:
   an inkjet unit to print the image on the keys of the keyboard;
   a hardening unit located on at least two sides of the inkjet unit; and
   a protective layer spray unit to spray a protective layer onto the keyboard, such that the protective layer spraying unit is positioned behind the inkjet unit,
wherein the printing unit is able to move the inkjet unit and the hardening unit in a horizontal fashion allowing the printing unit to print an image in one area of the keyboard and harden the image printed at a previous area of the keyboard, thus allowing the printing and hardening function to be carried out simultaneously,
wherein the inkjet head comprises a plurality of inkjet head portions, wherein each of the head portion discharges a different color of ink, and
wherein the keyboard manufacturing apparatus is configured such that the protective layer spray unit sprays the protective layer onto the keyboard simultaneously as the hardener dries ink printed onto another keyboard.

13. The keyboard manufacturing apparatus according to claim 12, wherein the protective layer spray unit to spray a protective layer onto the keyboard on an area wider than the printing image, thus allowing the protective layer to encapsulate the printing image.

14. The keyboard manufacturing apparatus according to claim 12, wherein the hardener is an ultraviolet light source.

15. The keyboard manufacturing apparatus according to claim 12, wherein the inkjet head and the hardener are aligned.

* * * * *

UNITED STATES PATENT AND TRADEMARK OFFICE
CERTIFICATE OF CORRECTION

PATENT NO.        : 9,199,483 B2          Page 1 of 1
APPLICATION NO.   : 13/712241
DATED             : December 1, 2015
INVENTOR(S)       : Hye Ran Yoon et al.

It is certified that error appears in the above-identified patent and that said Letters Patent is hereby corrected as shown below:

On the title page, item 72
Column 1 (Inventors), Line 2:
Delete "Hwanseong" and insert -- Hwaseong --, therefor.

Signed and Sealed this
Twenty-fourth Day of May, 2016

Michelle K. Lee
*Director of the United States Patent and Trademark Office*